United States Patent Office.

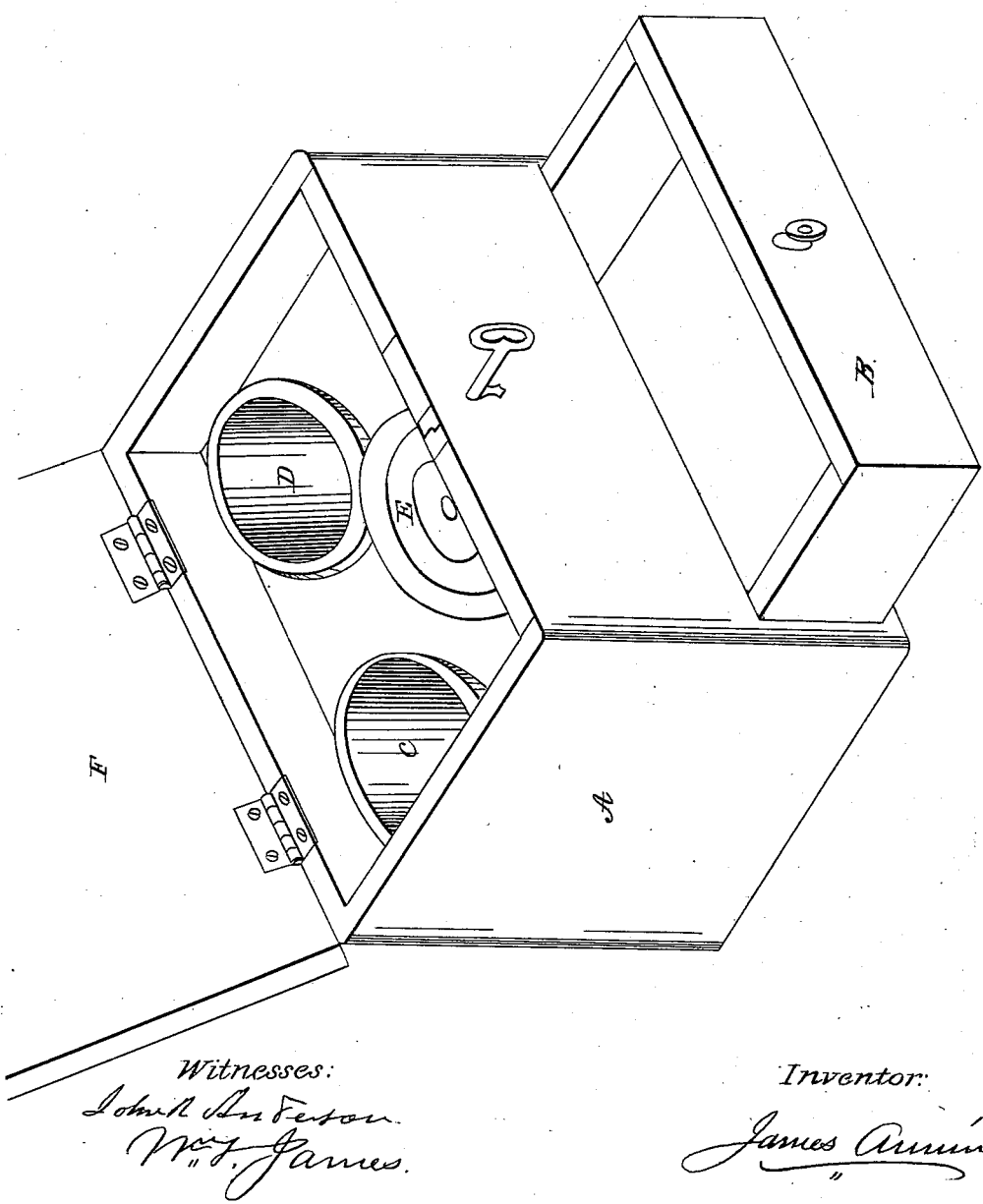

JAMES ANNIN, OF LE ROY, NEW YORK.

Letters Patent No. 64,271, dated April 30, 1867.

IMPROVED MODE OF CLEANING WATCHES, JEWELRY, &c.

*The Schedule referred to in these Letters Patent and making part of the same.*

TO ALL WHOM IT MAY CONCERN:

Be it known that I, JAMES ANNIN, of Le Roy, in the county of Genesee, and State of New York, have invented a new and useful Process for Cleaning Watches, Jewelry, Silver and Plated Ware, &c.; and I do hereby declare the following to be a full, clear, and exact description thereof, which will enable others skilled in the art to which it appertains to fully understand and use the same, reference being made to the accompanying drawing, making part of this specification, in which the figure represents a perspective view of a box, in which are retained the ingredients employed in carrying out my invention, which consists in cleaning watches, articles of jewelry, silver and plated ware, in a manner as will be hereinafter explained.

In the drawing, A represents a box or case, which is provided with an ordinary sliding drawer, B, near its bottom. The box has likewise two partitions, the upper one having three circular openings, through which are introduced three cups, C, D, and E, of corresponding shape, and which rest on the bottom partition. A lid, F, covers the box, and has a lock and key, which is readily operated. I have no particular claim to the construction of the box further than to facilitate the work intended to be performed, as also to complete my invention.

The ingredients I employ are cyanuret of potassium, soft water, alcohol, box-wood saw-dust. I first dissolve the alkali in soft water, in the proportion of one ounce to one pint. This I then place in the left-hand cup C. The right-hand cup D will contain pure, soft water. The middle cup E will contain alcohol. The drawer will be filled with fine box-wood saw-dust, and then all is ready for cleansing.

The operation is as follows: The watch-movements, articles of ware, or jewelry, are strung on fine wire, and dipped into the cyanuret of potassium from fifteen to sixty seconds. The grease, gum, and dirt will be dissolved or loosened, and the articles will resume their original brightness. It will be necessary to rinse them in water, which will be contained in cup D, and then dip them in the alcohol in cup E. This latter should occupy about thirty seconds, and it prevents the chemical action of the alkali. The articles are then worked or moved backwards and forwards in the saw-dust, which will thoroughly absorb all the moisture and dry quickly, rendering drying or rubbing of the hands entirely unnecessary.

It has been found by actual experiment that this process will do its work most effectually. It is not necessary to undo all parts of watches, only so far as that all shall be subjected to the action of the various ingredients herein stated. It has been also found that every part of a watch, from the main-spring to the hand, can be thoroughly cleansed in about ten minutes. The portable case also renders the process serviceable, for the ingredients can be kept in their respective receptacles, and always ready for use.

Having thus described my invention, what I claim as new, and desire to secure by Letters Patent, is—

The process of cleaning watches, jewelry, silver and plated ware, &c., by the ingredients and in the manner substantially as represented and described.

To the above I have signed my name this 18th day of March, 1867.

JAMES ANNIN.

Witnesses:
J. R. ANDERSON,
WM. T. JAMES.